United States Patent [19]
Sciaky et al.

[11] Patent Number: 4,572,941
[45] Date of Patent: Feb. 25, 1986

[54] METHOD OF AND INSTALLATION FOR SPOT-WELDING BY LASER BEAM

[75] Inventors: Mario Sciaky, Paris; Roland Cazes, St Maur; Georges Sayegh, Paris, all of France

[73] Assignee: Sciaky, S.A., Vitry, France

[21] Appl. No.: 624,654

[22] Filed: Jun. 26, 1984

[30] Foreign Application Priority Data

Jun. 27, 1983 [FR] France ............................ 83 10602

[51] Int. Cl.$^4$ ............................................. B23K 26/00
[52] U.S. Cl. ..................... 219/121 LD; 219/121 LC; 219/121 LQ; 219/121 LR
[58] Field of Search ................. 219/121 LC, 121 LD, 219/121 LP, 121 LQ, 121 LR; 350/6.6, 6.91

[56] References Cited

U.S. PATENT DOCUMENTS

| | | | |
|---|---|---|---|
| 3,848,970 | 11/1974 | Goodell | 219/121 LR X |
| 4,079,230 | 3/1978 | Miyanchi et al. | 219/121 LR X |
| 4,370,540 | 1/1983 | Davis et al. | 219/121 L X |

FOREIGN PATENT DOCUMENTS

| | | | |
|---|---|---|---|
| 0028095 | 3/1977 | Japan | 219/121 LT |
| 0025995 | 3/1978 | Japan | 219/121 LN |
| 0140699 | 12/1978 | Japan | 219/121 LW |
| 0116356 | 9/1979 | Japan | 219/121 LD |
| 0044486 | 3/1982 | Japan | 219/121 LC |
| 0181789 | 11/1982 | Japan | 219/121 LC |

OTHER PUBLICATIONS

A. W. Mueller, *IBM Technical Disclosure Bulletin*, "Laser Formation of Disks Using a Beamsplitter", vol. 22, No. 10, pp. 4723–4724, Mar. 1980.

*Primary Examiner*—C. L. Albritton
*Attorney, Agent, or Firm*—Seidel, Gonda, Goldhammer, & Abbott

[57] ABSTRACT

A method of spot-welding by laser beam, comprising a laser beam generator (10) and at least one means receiving the laser beam and focusing it on the pieces to be welded.

2 Claims, 13 Drawing Figures

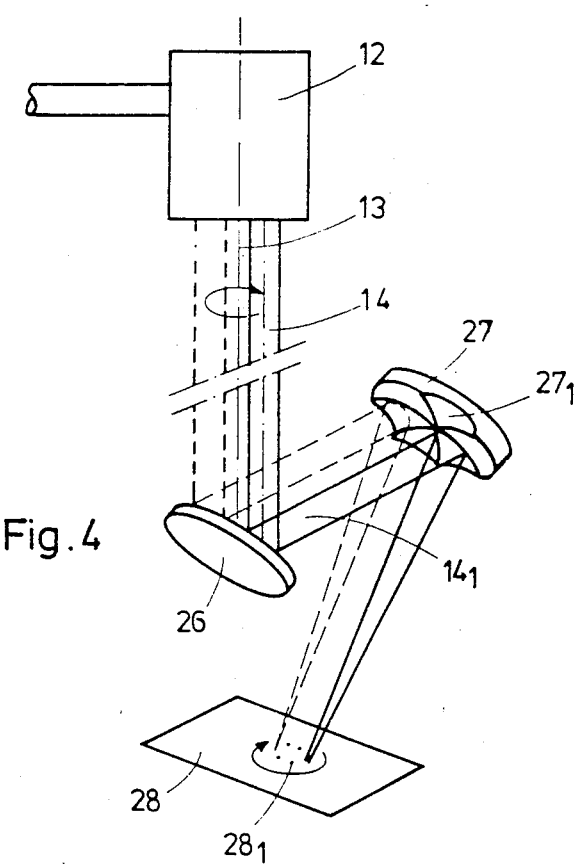
Fig.4
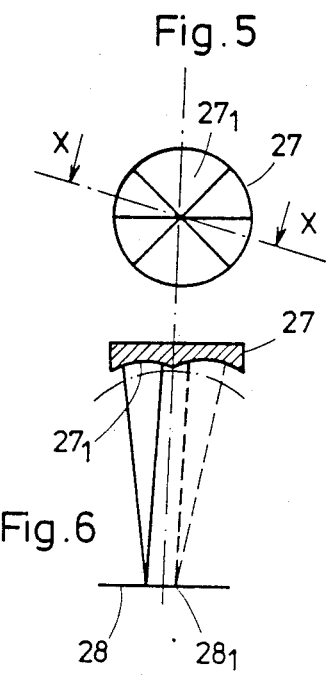
Fig.5
Fig.6
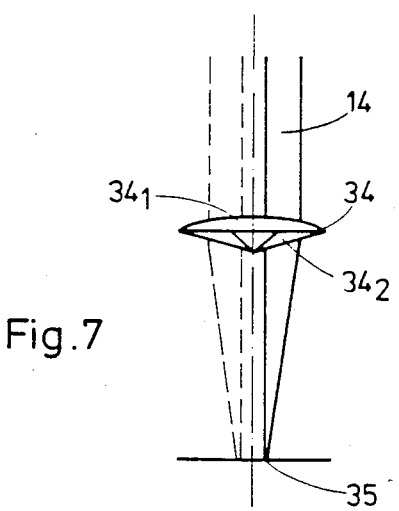
Fig.7
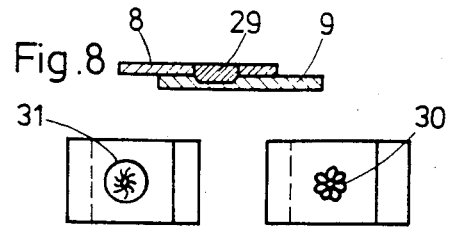
Fig.8
Fig.10  Fig.9

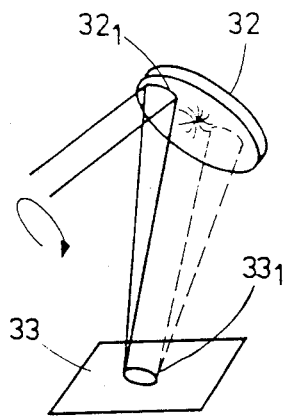 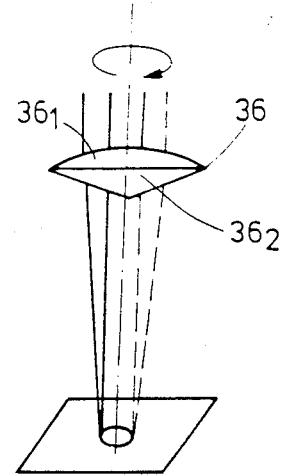
Fig.11  Fig.12
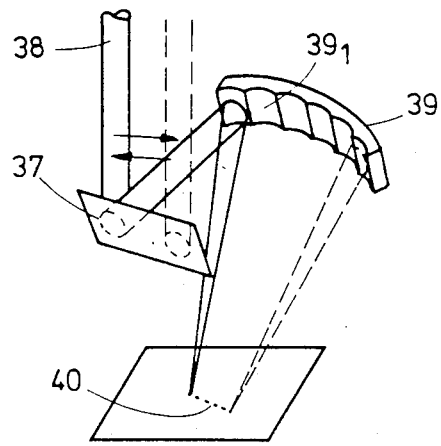
Fig.13

METHOD OF AND INSTALLATION FOR SPOT-WELDING BY LASER BEAM

The invention relates to a method of and an installation for spot-welding by a laser beam.

A focused laser beam of suitable power provides a high specific power which is utilised in the working of metals in general and in welding in particular where it makes it possible to obtain considerable penetration.

An important interest of laser beams resides in their ease of propagation in air over considerable distances with no notable energy loss, so that it is possible to supply on a time-sharing basis a number of working or welding stations dispersed throughout a workshop.

Thus, a laser beam can be used advantageously for performing on a large workpiece a succession of localised welds which are spaced out from one another as is the case with spot-welds made on a motor vehicle body in order to achieve elementary joints between superposed plates.

Welds of this type are generally made by the method known as resistance welding and two main techniques are involved:

The first resides in disposing, opposite each weld which is to be made, a complete welding assembly comprising a holding means and its support, heavy-section cables, a power transformer, supply and operating means therefore. The welding machine thus comprises as many welding equipment sets as there are welds to be made.

The second technique consists of using one or more robots each equipped with a welding assembly 1; each robot in succession performs some of the welds required to make the joint.

The robots must then displace the not inconsiderable mass of the welding tool in the shortest possible time spans, and at the limit of mechanical stress of the moving elements.

Using a laser beam makes it possible to resolve the problem of energy distribution from a single source, producing a parallel laser beam to different focusing devices which are disposed at a right angle to each weld to be made and which are required in order to obtain a focused laser beam of sufficient power to achieve the penetration effect vital for welding two superposed plates.

It is possible thus (see FIG. 1) to envisage an assembly of aligned retractable mirrors 1 which reflect in succession the laser beam 2 emanating from the generator 3 to each one of the focusing devices 4, 5, 6 so avoiding the considerable and complicated mechanical displacements described hereinabove in the case of a robot being used.

Moreover, it is well known that to obtain a sufficient cross-section of fusion $7_1$ on the pieces to be welded 7, it is necessary to apply a preferably circular displacement to the point of focus $2_1$ situated on the upper surface of the pieces. Indeed, a point of fusion which is obtained without such displacement is of insufficient diameter and multiplication of such fine welds is neither technically nor economically viable.

This entails each welding head being equipped with a motorised system $4_1$, $5_1$, $6_1$ controlling rotation of the point of focus 21, or more generally its displacement by action on the actual element which is provided in the devices 4, 5, 6, said element being a lens or concave mirror.

This need is translated by the use of as many systems for rotation or displacement and means of controlling such systems as there are welds to be made, these systems being required furthermore to function in relation to the actual beam control.

Thus, it is possible to obtain an assembly of a certain complexity of design and construction due to the bulk of each of these devices.

The principal object of the present invention is to remedy these drawbacks and to this end it relates to a method of spot-welding by laser beam, involving a laser beam generator and at least one means receiving the laser beam and focusing it on the pieces to be welded, the said method being characterised in that the laser beam emanating from a generator is displaced, the mobile laser beam being conveyed to a static focusing means which is constructed in such a way, that taking into account displacement of the beam, the point of focus is displaced over the workpieces to be welded.

According to another characteristic feature of the invention, the laser beam emanating from the generator is displaced parallel with its axis.

According to another characteristic feature of the invention, the laser beam is rotated.

According to another characteristic feature of the invention, the laser beam is caused to be displaced in one plane.

The invention likewise relates to the installation for carrying out this method.

By way of non-limitative example, the invention is illustrated in the accompanying drawings, in which:

FIG. 4 is a perspective view of an installation having a faceted mirror;

FIG. 5 is an elevational view of the mirror in FIG. 4;

FIG. 6 is a cross-section taken on the line X—X in FIG. 5;

FIG. 7 is a side view showing the focusing means which takes the form of a faceted lens;

FIG. 8 is a sectional view through a spot-weld made in accordance with the invention;

FIG. 9 is a plan view of FIG. 8;

FIG. 10 is an elevational view of another form of spot-weld;

FIG. 11 is a perspective view of another embodiment of focusing mirror;

FIG. 12 is a perspective view of another embodiment of focusing lens;

FIG. 13 is a perspective view of a focusing mirror which takes the form of a faceted strip.

Consequently, the object of the present invention is to provide an installation for spot-welding by laser beam which makes it possible to obtain spot-welds of acceptable surface area and therefore solidity by employing a static beam focusing head. This focusing head is static and therefore has no movable element in operation, and furthermore it offers the advantage of being small in size and of being simple in construction and assembly.

This result is obtained by displacement of the beam focusing point over the piece, this displacement of the point of focus resulting itself on displacement of the laser beam which strikes the static focusing means. The said focusing means may comprise either lenses or mirrors adapted in shape and size to the dimension and movement of the incident laser beam and the desired position of the point of focus. Furthermore, the nature of the material used in the construction of these focusing means will be determined according to the power of the laser beam used.

Figure 1:
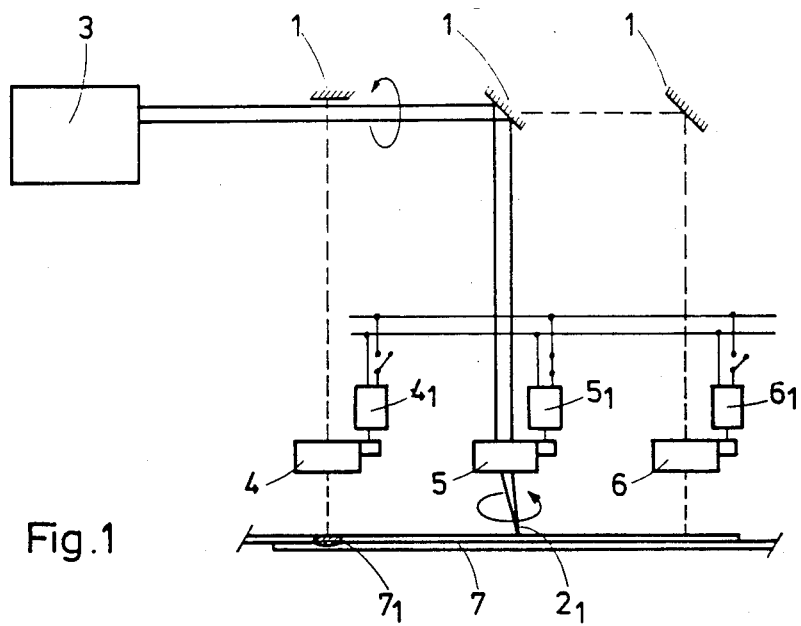
FIG. 1 is a diagrammatic view of a known type of welding installation.
Figure 2:
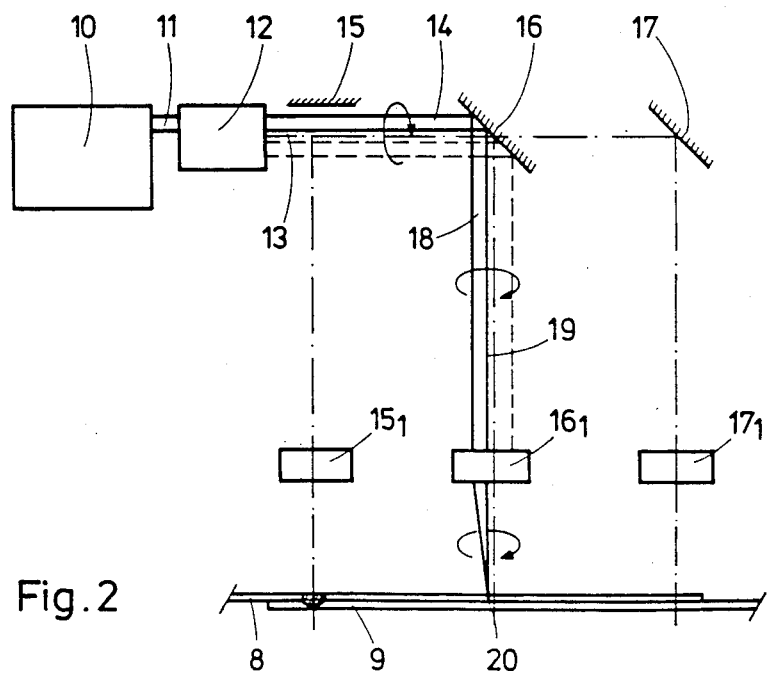
FIG. 2 is a diagrammatic side view of an installation according to the invention.

FIG. 2 shows a laser beam welding installation designed to make a succession of circular spot-welds between two plates 8 and 9.

In this case, the laser beam generator 10 produces a beam 11 which is carried into a device 12 which causes the laser beam to rotate parallel with and about an axis 13.

Aligned on this axis 13 are a plurality of flat mirrors 15, 16 and 17 which may either be offset from the axis 13 or may be located according to this axis in order to reflect the turning beam 14 towards the corresponding focusing device $15_1$, $16_1$, $17_1$.

These focusing devices which receive the laser beam 18 reflected by the mirrors 15, 16 or 17 and which is turning about the axis 19, ensure focusing of this beam 18 on a point 20 located on the upper face of the superposed workpieces 8, 9, the said point 20 effecting on these workpieces a circular path according to the circular trajectory of the incident beam 18. Then, progressively while it is rotating, the laser beam focused on the workpieces has the effect of fusing the pieces along their zone of contact and hence welding them at a point the diameter of which substantially corresponds to that of the circle bounded by the circular path of the point of focus 20.

It will be understood that provision of this focusing means solely by using static elements will make it possible to simplify its construction and assembly and in particular to reduce its bulk which is greatly desirable to allow on the one hand a bringing-together of the weld points and hence reinforcement of the assembly, while at the same time releasing the maximum space for the tools which position and grip the two workpieces to be assembled.

In the example shown in FIG. 2, the device 12 ensures rotation of the laser beam parallel with and about the axis 13. In another form of embodiment, however, it might be envisaged to cause this laser beam emanating from the device 12 to pivot about the axis 13 so that it describes a circular path or any other path suitable for the result which is to be achieved.

Figure 3:
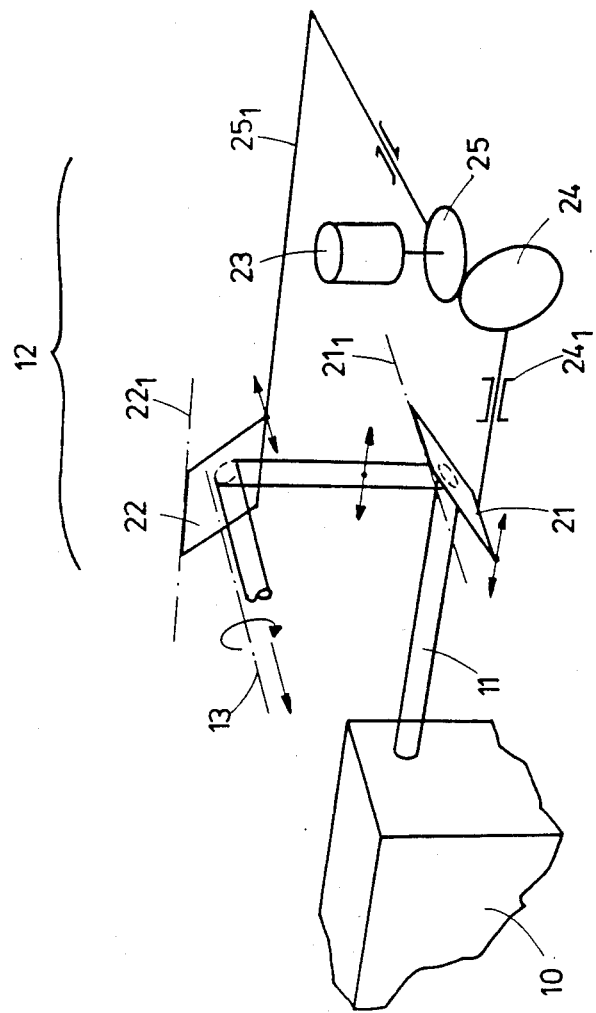
FIG. 3 is a diagrammatic perspective view showing an embodiment of the device for displacing the laser beam in accordance with a circular rotary movement.

FIG. 3 shows an embodiment of the device 12 which ensures displacement of the laser beam in a circularly translatory pattern.

In this case, the beam 11 emanating from the generator 10 is reflected successively by two flat mirrors 21 and 22 which are caused respectively to pivot about perpendicular axes $21_1$ and $22_1$. This pivoting action is obtained by reason of an electric motor 23 which drives two gearings 24 and 25 each connected by a mechanical transmission $24_1$ and $25_1$ to the mirrors 21 and 22.

This combined pivoting of the two mirrors 21 and 22 in two perpendicular directions will then make it possible to obtain translatory movement of the emergent beam 14 about the axis 13, said axis 13 constituting an axis of revolution for the beam 14 in so far as the amplitude and speed of the pivoting movements of the mirrors 21 and 22 are identical and in so far as these oscillating movements of these mirrors are out of phase by 90°. Any other displacement of the laser beam may however be achieved by modifying the amplitude, the speed and the phase of these two movements.

In the embodiment shown in FIG. 4, the focusing devices $15_1$, $16_1$ and $17_1$ comprise mirrors. In this case, the turning laser beam 14 originating from the device 12 is carried to a first flat mirror 26 which reflects it onto a second mirror 27 consisting of several adjacent segments $27_1$, each defining a concave mirror capable of reflecting and focusing the laser beam on neighbouring points which jointly define a circular trajectory, these points being situated on a focusing plane 28 constituted by the upper face of the pieces which are to be welded. Thus, during the course of one rotation of the beam 14 about the axis 13, the beam 14 reflected by the flat mirror 26 is brought successively onto the concave segments $27_1$ which successively focus the beam onto the focusing plane 28 at neighbouring points so that all the spot-welds made at the level of the focusing points $28_1$ together form a spot-weld 29 between the two workpieces (see FIG. 8), the surface area of this spot-weld being such as to ensure solid connection of the two pieces.

In the embodiment shown in FIGS. 4, 5 and 6, the use of the mirror 27 will therefore make it possible to obtain spot-welds on the workpieces which are to be assembled . . . (Translator's note: There would appear to be words missing from the bottom of p.7 of the original specification, as there is no logical continuity with the first line on p.8) . . . is shown at 30 on FIG. 9. However, if the mirror 27 which has adjacent concave segments $27_1$, is replaced by a mirror the reflecting surface of which defines a surface of revolution, or substantially of revolution according to the angle of incidence of the beam, then in this case there will be a continuous displacement of the point of focus of the beam on the workpieces in order to obtain a continuous fusion line and, for example, a continuous circular line of fusion on these two pieces, such fusion likewise, by cumulative thermal conduction, ensuring a fusing together and welding of the two pieces along a surface 31 corresponding substantially to the surface defined by the path of the point of focus.

An example of such a mirror is shown at 32 in FIG. 11, the reflective surface $32_1$ of this mirror being constituted by a toric concave surface ensuring focusing of the laser beam according to a circular path $33_1$ situated on the focusing plane 33.

The static focusing means used according to the invention may likewise be provided by using a lens.

Thus, according to the example in FIG. 7, the focusing means consists of a lens 34 of which the upper face $34_1$ which receives the movable incident laser beam 14, is convex, while the underside $34_2$, from which the focused laser beam emerges, is constituted by adjacent facets which together define a pyramid, the convex or concave plane surface of these facets being adapted to the successive focusing of the laser beam on adjacent points which together define a circular path.

Of course, this focusing lens may be designed in such a way as to produce a continuous fusion line on the focusing plane and in this case this lens will for example (see FIG. 12) consist of a lens 36 of which the upper face $36_1$ is convex and of which the underside $36_2$ defines a surface of revolution, for example a conical surface having a straight or curved (concave or convex) generatrix.

If it is desired to use the method according to the invention in order to obtain not a spot-weld but in contrast a weld-line, then in this case the laser beam originating from the generator will be displaced by sweeping according to a plane in order to strike a first flat mirror 37 (see FIG. 13). This sweeping will be obtained by either movement of the beam 38 or on the contrary by pivoting. The beam reflected by the mirror 37 is then directed at a mirror 39, the reflective surface of which has adjacent facets which are for example concave, adapted to reflect the laser beam on neighbouring or adjacent points of focus 40 on the focusing plane.

We claim:
1. A method of spot-welding by laser beam, comprising generating a laser beam, rotating said beam about an axis parallel to its longitudinal axis, directing said rotated beam onto a static focusing means and directing the point of focus of said rotated beam by said static focusing means onto the objects to be welded.
2. A method according to claim 1, characterised in that the laser beam is displaced in one plane.

* * * * *